July 8, 1930.  C. B. JONES  1,769,955
VEHICLE PILOT OR WHEEL GUARD
Filed Nov. 16, 1929
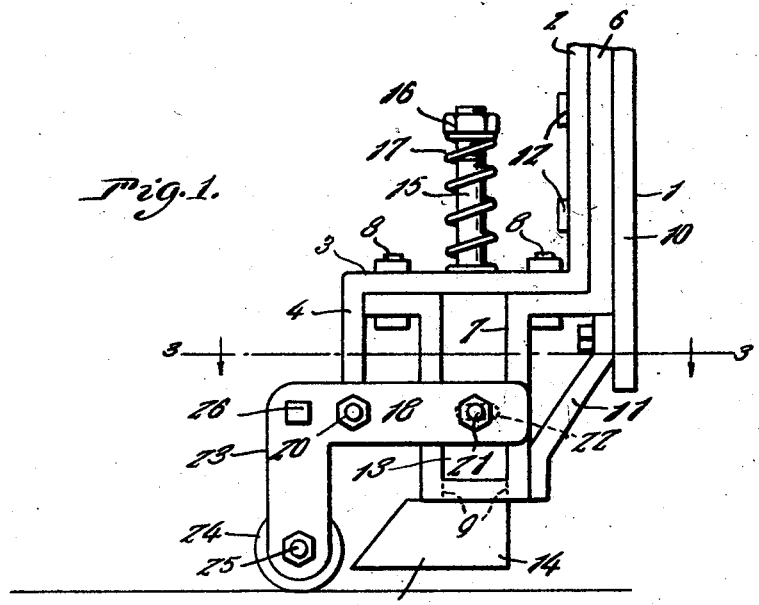
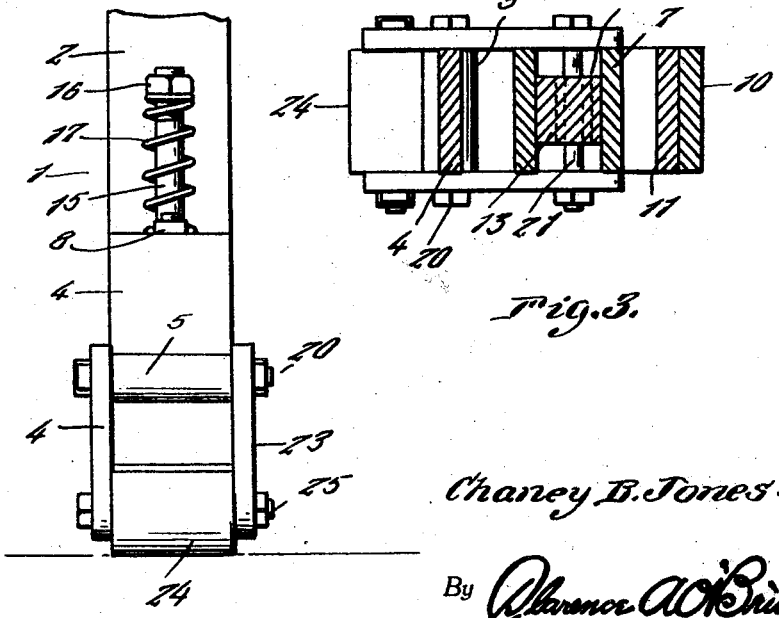
Inventor
Chaney B. Jones
By Clarence A. O'Brien
Attorney Patented July 8, 1930

1,769,955

UNITED STATES PATENT OFFICE

CHANEY B. JONES, OF FULTON, KENTUCKY

VEHICLE PILOT OR WHEEL GUARD

Application filed November 16, 1929. Serial No. 407,692.

This invention relates to a vehicle pilot or wheel guard and more particularly to a device of this character which is especially adapted for use on vehicles which run on rails but it is to be understood that a device constructed in accordance with this invention may be mounted for use on any type of vehicle for which the same is found adapted, such as an automobile.

An important object of the invention is to provide, in a manner as hereinafter set forth, a device of the aforementioned character having means for preventing an object which may be in the path of the vehicle from getting under the wheels thereof when struck thereby, said means being automatically operated by contact with the object which is struck.

Another important object of the invention is to provide a vehicle pilot or wheel guard of the aforementioned character having means thereon for automatically returning the same to its inoperative position at the proper time.

Other objects of the invention are to provide a device of the character set forth which will be simple in construction, strong, durable, efficient in its use and which may be manufactured at low cost.

Still further objects of the invention will become apparent from a study of the following specification, taken in connection with the accompanying drawing wherein like characters of reference designate corresponding parts throughout the several views, and wherein:—

Figure 1 is a view in side elevation of a vehicle pilot or wheel guard constructed in accordance with this invention.

Figure 2 is a front elevational view thereof.

Figure 3 is a horizontal sectional view taken substantially on the line 3—3 of Figure 1 and looking in the direction of the arrows.

Referring to the drawing in detail, the reference character 1 designates generally a supporting bracket or structure which is adapted to be secured to a convenient portion of the vehicle frame or chassis forwardly of the front wheel thereof and said bracket comprises a strip 2 having a forwardly and horizontally disposed portion 3 which terminates in a downwardly extending portion 4 at its forward end and upon the lower end of the portion 4 an eye 5 (see Figure 2) is formed.

The strip 2 is mounted on the forward side of a strip 6 which is provided with a forwardly extending substantially U-shaped portion 7 on its lower end which is secured to the portion 3 of the strip 2 through the medium of the bolt 8 and the bight portion thereof is provided with a rectangular opening 9 the purpose of which will be hereinafter more fully set forth. A straight strip 10 is mounted on the rear side of the strip 6 and its lower end projects below the vertical portion of said strip 6 as seen most clearly in Figure 1 of the drawing. A brace 11 is anchored to the depending end of the strip 10 and extends forwardly and downwardly therefrom into engagement with the lower end portion of the U-shaped portion 7 for the purpose of strengthening the same. The strips 2, 6 and 10 are secured together by suitable means such as stud bolts, the heads of which are indicated by 12 in Figure 1 of the drawings. A rectangular bar 13 is mounted for vertical sliding movement in the U-shaped portion 7 of the bracket and said bar extends downwardly through the opening 9 in the bight portion thereof and has integrally mounted on its lower end the shoe or deflector head 14. Upon the upper end of the bar 13 there is formed an integral reduced shank 15 of circular cross section having its upper end portion threaded and a nut 16 threaded thereon. The upper end of the bar 13 engages against the adjacent face of the portion 3 of the bracket and the shank 15 extends upwardly therefrom through a circular opening (not shown). An expansible coil spring 17 has its opposite ends impinged on the portion 3 and the lower side of the nut 16, respectively, for maintaining the bar 13 and shoe 14 in raised position.

A pair of spaced parallel arms 18 are pivotally mounted, intermediate their ends, on the lower end of the portion 4 of the bracket through the medium of the pivot bolt 20 which extends transversely therethrough and through the eye 5 on the lower end of said portion 4. The rear end portions of the arms 18 are pivotally connected to the bar 13 in a manner to shift said bar vertically in the portion 7 when said arms are swung on the pivot bolt 20 through the medium of a transversely extending bolt 21 which extends through a slot 22 in the bar. The forward ends of the arms 18 terminate in right angularly disposed downwardly extending portions 23 between the lower end portions of which is journaled a roller 24 which is mounted for rotation on the bolt 25. A transverse brace 26 extends between the forward portion of the arms 18 for strengthening the same.

In the use of the invention, when the same is mounted on a rail vehicle, the roller 24 is disposed close to the top surface of the rail and when the same comes into contact with an object which is on the rail the roller tends to ride over said object with the result that the rear ends of the arms 18 will be swung downwardly and the bar 13 together with the shoe 14 will be forced downwardly into engagement with the rail against the tension of the spring 17. If desired, suitable means may be provided for warning the operator of the vehicle when an object has been struck, such as suitable contacts provided on the device in such a manner that a circuit will be closed and a visible or audible signal given which will be seen by said operator. It is further within the contemplation of this invention that the same may be suitably coupled to the braking system of the vehicle in a manner to automatically apply the brakes by the movement of the invention into operative position. When the object has been removed from beneath the roller 24 the expansible spring 17 will be permitted to raise the bar 13 and shoe 14 thereon out of engagement with the track and the roller 24 will, of course, return to its lowered position adjacent said track.

It is believed that the many advantages of a device constructed in accordance with this invention will be readily understood, and although the preferred embodiment of the invention is as illustrated and described, it is to be understood that changes in the details of construction may be had which will fall within the scope of the invention as claimed.

What is claimed is:—

1. A vehicle pilot or wheel guard of the character described comprising a bracket, a spring controlled bar mounted for vertical reciprocation on the bracket, a rail engaging shoe on the lower end of the bar, a pair of arms pivotally mounted on the bracket forwardly of the bar and having their rear end portions pivotally coupled thereto and a roller journaled between the forward ends of the arms and adapted to rock the same when said roller engages an object in its path of travel for shifting the shoe into engagement with the rail.

2. A vehicle pilot or wheel guard of the character described comprising a bracket adapted to be mounted on said vehicle forwardly of the front wheel thereof, a vertically disposed rectangular bar mounted for vertical sliding movement on the bracket, a rail engaging shoe on the lower end of the bar, a threaded shank extending upwardly from the upper end of the bar and formed integrally therewith, a nut threaded on the free end portion of the shank, an expansible spring encircling the shank and impinged against the nut thereon and the bracket for yieldingly maintaining the bar and the shoe in raised position, a pair of actuating arms pivotally mounted on the bracket forwardly of the bar and having their rear end portions pivotally coupled to said bar, said arms having their opposite end portions disposed at right angles and downwardly directed and a roller journaled between the lower end portions of the arms adjacent the rail and adapted for engagement with an object in its path of travel for rocking the arms in a manner to shift the shoe into engagement with the rail.

3. A vehicle pilot or wheel guard of the character described comprising a bracket adapted for attachment to the vehicle forwardly of the front wheel thereof, and including a plurality of flat metallic strips superimposed upon each other, one of said strips being provided with a forwardly extending horizontally disposed portion terminating in a downwardly extending portion, a journal eye on the lower end of the downwardly extending portion, the horizontally disposed portion being provided with a transverse opening, another strip having a substantially U-shaped portion disposed beneath the horizontally disposed portion of the first named strip and having the bight of its U-shaped portion provided with an opening in vertical alignment with the opening in the horizontal portion of the first named strip, a vertically disposed bar mounted for vertical sliding movement in the U-shaped portion of the second-named strip and extending through the opening in the bight thereof, a rail engaging shoe on the lower end of the bar, an upwardly extending threaded shank on the upper end of the bar extending through the opening in the horizontal portion of the first-named strip, said shank of less diameter than said bar, said bar having its upper end adapted to engage said horizontal portion to limit the upward movement of the bar, a nut threaded on the free end portion of the shank, an expansible spring impinged against the nut and the horizontal portion, a pair of actuating arms pivotally mounted in the eye on the bracket and having their rear end portions pivotally coupled to the bar, the forward portions of said arms extending downwardly at right angles, and a roller journaled between the lower end portions of the arms and adapted for engagement with an object in its path of travel for rocking the arms in a manner to shift the shoe into engagement with the rail.

In testimony whereof I affix my signature.

CHANEY B. JONES.